United States Patent
Krauch et al.

(10) Patent No.: US 9,913,480 B2
(45) Date of Patent: *Mar. 13, 2018

(54) COOKING AID

(71) Applicant: NESTEC S.A., Vevey (CH)

(72) Inventors: Jose Krauch, Singen (DE); Peter Hangarter, Ohningen (DE); Johan Jacob Van Der Pol, Ennetbaden (CH); Jorg Resemann, Radolfzell (DE)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,883

(22) Filed: Apr. 5, 2017

(65) Prior Publication Data

US 2017/0231233 A1 Aug. 17, 2017

Related U.S. Application Data

(63) Continuation of application No. 13/813,606, filed as application No. PCT/EP2011/060990 on Jun. 30, 2011, now Pat. No. 9,675,082.

(30) Foreign Application Priority Data

Aug. 5, 2010 (WO) .................. PCT/EP2010/061385

(51) Int. Cl.
| | | |
|---|---|---|
| *B65D 81/34* | (2006.01) | |
| *A21B 3/15* | (2006.01) | |
| *A23L 5/10* | (2016.01) | |
| *A23L 13/40* | (2016.01) | |
| *A23L 27/10* | (2016.01) | |
| *A23P 20/10* | (2016.01) | |
| *A23P 20/00* | (2016.01) | |
| *A23P 10/35* | (2016.01) | |
| *A23L 17/00* | (2016.01) | |
| *A23L 27/00* | (2016.01) | |
| *A23L 13/00* | (2016.01) | |
| *A23P 20/18* | (2016.01) | |
| *A23P 10/10* | (2016.01) | |

(52) U.S. Cl.
CPC ..................................... *A21B 3/15* (2013.01); *A23L 5/10* (2016.08); *A23L 13/03* (2016.08); *A23L 13/428* (2016.08); *A23L 13/43* (2016.08); *A23L 17/75* (2016.08); *A23L 27/10* (2016.08); *A23L 27/70* (2016.08); *A23L 27/72* (2016.08); *A23P 10/10* (2016.08); *A23P 10/35* (2016.08); *A23P 20/11* (2016.08); *A23P 20/18* (2016.08); *A23P 20/19* (2016.08); *B65D 81/343* (2013.01); *A23V 2002/00* (2013.01); *B65D 2581/3429* (2013.01)

(58) Field of Classification Search
CPC ........ A23L 13/428; A23L 13/43; A23L 27/72; A23L 5/10; A23L 27/70; A23L 13/03; A23L 17/75; A23L 27/10; A23P 10/10; A23P 10/35; A23P 20/11; A23P 20/18; A23P 20/19; B65D 2581/3429; B65D 2581/3416; B65D 81/3461; A23D 9/00; A21B 3/15

USPC ......... 426/420, 307, 90, 132, 523, 601–612, 426/113, 129, 394

See application file for complete search history.

(56) References Cited

U.S. PATENT DOCUMENTS

| | | | |
|---|---|---|---|
| 2,759,830 A | | 4/1954 | Touceda |
| 2,902,371 A | | 2/1957 | Shorr |
| 2,855,311 A | | 10/1958 | Nelson |
| 3,042,532 A | | 10/1959 | Gordon |
| 3,730,076 A | | 5/1973 | Levin |
| 3,754,933 A | * | 8/1973 | Shinkawa ............... A23L 13/62 426/307 |
| 4,023,912 A | * | 5/1977 | Mahler .................... A21D 8/08 106/244 |
| 4,299,851 A | | 11/1981 | Lowe |
| 4,356,202 A | | 10/1982 | Todd |
| 4,663,170 A | | 5/1987 | Matthews et al. |
| 4,904,488 A | | 2/1990 | LaBaw et al. |
| 5,705,214 A | * | 1/1998 | Ito ...................... A22C 13/0013 426/105 |
| 5,736,180 A | | 4/1998 | Peiffer et al. |
| 5,874,117 A | * | 2/1999 | Sundram ................ A21D 2/145 426/2 |
| 5,922,377 A | | 7/1999 | Nordstrom |
| 6,106,885 A | * | 8/2000 | Huizinga ............... A23D 7/001 426/601 |
| 6,153,233 A | | 11/2000 | Gordon |
| 6,488,973 B1 | * | 12/2002 | Wright .................... A23B 4/07 426/114 |

(Continued)

FOREIGN PATENT DOCUMENTS

| | | |
|---|---|---|
| DE | 290015 | 3/1914 |
| DE | 4343670 | 6/1995 |

(Continued)

OTHER PUBLICATIONS

Japanese Office Action for Application No. P2013-522165, Dispach No. 654006, dated Jan. 6, 2015, 6 pages.

(Continued)

*Primary Examiner* — Drew E Becker
(74) *Attorney, Agent, or Firm* — K&L Gates LLP

(57) ABSTRACT

A cooking aid includes a sheet of flexible burn resistant material and a composition disposed on one face of the sheet. The composition contains a mixture of vegetable or animal oil with a melting point below 20° C., vegetable or animal fat with a melting point above 20° C., and one or more herbs, spices and flavor enhancers.

14 Claims, No Drawings

(56) References Cited

U.S. PATENT DOCUMENTS

| | | | |
|---|---|---|---|
| 7,479,294 B2 | 1/2009 | Sokhey et al. | |
| 8,883,235 B2* | 11/2014 | Jensen | B65D 81/3469 426/93 |
| 9,675,082 B2* | 6/2017 | Krauch | A21B 3/15 |
| 2004/0047953 A1 | 3/2004 | Lauby | |
| 2004/0241291 A1 | 12/2004 | Liu | |
| 2005/0013951 A1 | 1/2005 | Mitchell et al. | |
| 2005/0271783 A1 | 12/2005 | Digges et al. | |
| 2006/0153952 A1 | 7/2006 | Frank | |
| 2006/0159806 A1* | 7/2006 | Darin | A23D 9/007 426/94 |
| 2010/0316780 A1 | 12/2010 | Corbin et al. | |
| 2012/0128836 A1 | 5/2012 | Carroll | |

FOREIGN PATENT DOCUMENTS

| | | |
|---|---|---|
| DE | 102005057833 | 7/2006 |
| EP | 0158590 | 10/1985 |
| EP | 0408164 | 1/1990 |
| EP | 168734 | 7/2006 |
| EP | 1683734 | 7/2006 |
| EP | 1977650 | 10/2008 |
| JP | 6361293 | 4/1988 |
| JP | 2000037171 | 2/2000 |
| JP | 2000037173 | 2/2000 |
| JP | 2000270770 | 10/2000 |
| JP | 2002218915 | 8/2002 |
| JP | 2007189997 | 8/2007 |
| JP | 2007274822 | 10/2007 |
| WO | 0078155 | 12/2000 |

OTHER PUBLICATIONS

Chinese Office Action for Application No. 201180038742.8, dated Mar. 31, 2015, 12 pages.
International Search Report and Written Opinion dated Sep. 26, 2011 for Intl. Appln. No. PCT/EP2011/060990.

* cited by examiner

COOKING AID

PRIORITY CLAIM

The present application is a continuation of U.S. patent application Ser. No. 13/813,606 filed Jan. 31, 2013 (now U.S. Pat. No. 9,675,082), which is a National Stage of International Application No. PCT/EP2011/060990 filed Jun. 30, 2011, which claims priority to International Application No. PCT/EP2010/061385 filed Aug. 5, 2010, the entire contents of which are incorporated herein by reference.

FIELD OF THE INVENTION

The invention relates to a cooking aid and to the use of the cooking aid for cooking food. The cooking aid is an assembly comprising a sheet of flexible burn resistant material such as a baking paper, or similar material, and a composition of a fat and oil blend together with herbs, spices and flavour agents.

BACKGROUND

Meat and many other foods are traditionally cooked in an oven or a pan, and often with various condiments and flavour enhancing agents to provide a tasty and appealing flavoursome cooked dish. It is well known that cooking meat can lead to a certain amount of messiness of the oven or pan and surrounding surfaces. The degree of mess that needs to be cleaned up post-cooking can vary markedly depending on the nature of the food being cooked, the temperature of cooking, and other factors. It is commonplace for the walls of the oven or the surfaces surrounding an open cooking pan to become splattered and stained with fat and oil, and cooking juices, etc. Cooking meat normally requires a considerable amount of cleaning of surfaces after the cooking process.

There is an increasing demand for food preparation in the home to be fast and convenient, and with a minimum of clean-up required after cooking.

It is also important to be able to flavour the food being cooked with herbs, spices and other flavouring agents. Such ingredients can be added before or during cooking. They can be added individually or as a mix, but care must be taken to add the right amounts of each to give the desired flavour of cooked food. Sometimes when adding spices to meat that is being cooked or about to be cooked (e.g. by sprinkling on the meat), it is easy to add too much or too little or to add too much in some places and none in other places.

Simple cooking techniques have been developed over many years attempting to address these needs, with some success. But the typical home cook continues to search for an easy and convenient way of cooking meat and vegetables cleanly and with added flavourings and garnishes.

U.S. patent application Ser. No. 10/890,947 (published as U.S. 2005-0013951) describes a packaging material for a cook-in food package formed from an aluminum foil sheet for providing uniform heat distribution, and a paper sheet for direct contact with the food and for providing a non-stick surface.

DE 2900195 describes an insert for a frying pan which requires no oil or fat for the frying of meat. The insert consists of a disc having a diameter slightly larger than the bottom of the frying pan, and is made of paper with a silicone polymer coating.

The Japanese patent application published as JP 2000-037171 concerns a spice containing sheet capable of uniformly and moderately imparting a spice, such as salt or a condiment, to a food preparation. According to this patent application, hydrocolloids, like corn starch, potato starch, rice starch or tapioca are used to adhere herbs, spices and flavouring substances to the sheet. The drawback of this practice is that hydrocolloids are poor transmitters of heat. They tend to get too hot and do not to melt. There is therefore a high risk of burning the preparation, especially any herbs and spices used as garnishes, and also the sheet. The hydrocolloids function solely as a glue.

The applicant has now found a simple and effective way to flavour food in readiness for cooking and to cook the food so that there is a minimum of splashing and splattering of cooking juices onto walls and other surfaces, without burning of garnishes or any cooking materials, and where the addition of oil or fat by the cook for cooking the food is avoided.

The object of the invention is to provide a cooking aid that overcomes, at least in part, one or more of the above problems with known cooking methods.

SUMMARY

In a first aspect of the invention, there is provided a cooking aid comprising:
  a) a sheet of flexible burn resistant material;
  b) a composition disposed on one face of the sheet, the composition comprising a mixture of:
     i. vegetable or animal oil with a melting point below 20° C.;
     ii. vegetable or animal fat with a melting point above 20° C.; and
     iii. one or more herbs, spices and flavour enhancers.

The sheet may be made of any material suitable for the purpose, but is preferably a baking paper.

Preferably, the oil is selected from the group consisting of sunflower oil, rape seed oil, cotton seed oil, peanut oil, soya oil, olive oil, palm oil, coconut oil, and palm kernel oil. The fat is preferably selected from the group consisting of pork fat, tallow, lard, bone fats, butter, fractionated palm fat, and any fully or partially hydrogenated or inter-esterified palm oil, cotton seed oil, peanut oil, soya oil, olive oil, sunflower oil, or rape seed oil.

In preferred embodiments of the invention, the composition comprises oil in the amount of 1 to 34% by weight and fat in the amount of 66 to 99% by weight. Preferably, the oil and fat together comprise 5 to 20% by weight of the composition. The composition may also comprise 0.01 to 1% by weight of a monoglyceride, sterol, or lecithin. The one or more herbs and spices are preferably selected from the group consisting of parsley, rosemary, pepper, and chives. The one or more herbs, spices and flavour enhancers preferably comprise 0.5 to 75% by weight of the composition. The flavour enhancers may comprise 10 to 80% by weight of the composition. Preferred flavour enhancers may be inorganic salts, salts of amino acids, protein hydrolysates, flavouring preparations, and yeast extracts.

In a second aspect of the invention, there is provided a process for the preparation of a cooking aid of the first aspect of the invention comprising:
  a) extending the sheet of flexible burn resistant material on a flat surface;
  b) spreading a blend of fat and oil on the sheet; and
  c) distributing the one or more herbs, spices and flavour enhancers over the blend of fat and oil.

The process may also include the step of coating the one or more herbs, spices and flavour enhancers with oil, for example sunflower oil, preferably by spraying the oil.

In a further aspect, there is provided a use of a cooking aid of the first aspect of the invention for cooking food, where pieces of the food are placed on the cooking aid in direct contact with the composition and are cooked. Preferably, the food is meat such as beef, lamb, chicken, or fish. Alternatively, the food may be vegetables or vegetable pieces such as zucchinis, egg plant, tomatoes, or any other fleshy vegetable suitable for cooking in this manner.

DETAILED DESCRIPTION

The invention provides a simple and effective way to cook food with a minimum of splashing and splattering of cooking juices onto walls and other surfaces and with a coating of garnishes and flavour enhancers without burning of garnishes or any cooking materials.

The consumer can pan fry or oven cook using a conventional baking paper coated with a mix of fat, oil, herbs, spice mixes and flavour enhancers. An important advantage is that no additional fat or oil needs to be added to the pan or oven dish. In other words, the fat and oil used for coating the baking paper with herbs, spice mixes and flavour enhancers have a dual purpose, i.e. to adhere the herbs, spice mixes and flavour enhancers to the paper and to provide the fat or oil needed for cooking.

Several additional benefits are provided by this invention:
- the herbs and other garnishes will not burn during cooking
- the food (especially beef, lamb, chicken, or fish meat) will preserve its natural juiciness as loss of moisture is markedly reduced by the sheet covering
- excess fat in the pan or oven dish is avoided so that the splashing of cooking juices on walls and cooking surfaces is dramatically reduced or avoided altogether, and post-cooking cleaning is minimized The sheet of burn resistant flexible material may be any film, foil or laminate, or any combination of such materials including, for example, paper, Teflon®, or susceptor materials, and even natural leaves such as banana leaves and algae leaves. The preferred sheet material is baking paper, which is paper typically used commercially for baking purposes. Such paper is usually a cellulose paper coated with silicon. Although this paper is more often used for oven cooking, it is suitable for use in this invention for cooking either in a pan or in an oven.

The mixture of fat and oil in the composition coating the sheet has two important functions. The first is to maintain the flexibility of the sheet and ensure that the herbs and spice mixes adhere to the sheet during handling, transportation, preparation and cooking. The second is provide the fat or oil for cooking so that no additional fat or oil needs to be added by the cook.

In the context of this invention, an oil is liquid at a temperature of 20° C. at a pressure of 1 atm, and a fat is solid at this temperature and pressure.

Examples of vegetable and animal oil are sunflower oil, rape seed oil, cotton seed oil, peanut oil, soya oil, olive oil, the refined edible fractions of palm oil, coconut oil, and palm kernel oil, which may be used alone or in combination. The preferred choice is sunflower oil or a refined palm oil due to their neutral flavour and good commercial availability.

Examples of animal and vegetable fat are butter, pork fat, tallow, lard, and bone fat, fractionated palm fat, and any fully hydrogenated, inter-esterified, hydrogenated, non-hydrogenated, fractionated oil such as palm oil, cotton seed oil, peanut oil, soya oil, olive oil, sunflower oil, or rape seed oil. Most preferably, the fat is a fractionated fat or a hydrogenated and inter-esterified palm oil, which has a neutral flavour, low trans-fatty acid profile and good commercial availability.

The amount of oil is preferably between 1 and 34% and the amount of fat between 66 and 99% by weight of the composition. Most preferably, the amount of oil is around 20% and the amount of fat around 80% by weight. The optimum oil/fat blend composition may be determined by function of the processing temperature and the output of the production line needed for the manufacturing process to be economically viable.

0.01 to 1% of a monoglyceride, sterol, or lecithin may be included as a stabilizer and emulsifier to control and improve product stability against temperature fluctuations after production and use in different climatic conditions.

The amount of fat and oil may between 5 and 20% of the total weight of the composition, more preferably about 15%.

The amount of herbs and spices in the composition may be between 0.5 and 75% of the total weight of the composition. Preferably, the amount is between 10 and 20%, depending on the recipe. The herbs used are typically parsley, rosemary, oregano, marjoram, tarragon, pepper, chives, and other similar herbs common in culinary use. The more commonly used spices include chillies, paprika, tomato and other natural flavour rich fruits used in culinary applications.

The amount of flavour enhancers may be between 10 and 80% of the total weight of the composition, preferably between 60 and 70%. The flavour enhancers used are typically salts, such as sodium chloride or potassium chloride, salts of amino acids and derivatives such as monosodium glutamate, protein hydrolysates, ribonucleotides, natural and non-natural flavours and flavouring preparations, yeast extracts and other preparations known as taste enhancers.

The sheet may be any size suitable for the cooking operation, and may be adapted to the local commonly used individual sizes of meat, which is typically 100 to 300 g in most countries.

The invention also relates to a process for the industrial or home preparation of the cooking aid, which may be a continuous process in the industrial setting, where:
- the sheet is extended on a flat surface,
- a blend of the fat and oil is spread on the sheet,
- the herbs, spices and flavour enhancers are distributed over the coated sheet,
- the herbs and spices may be coated with oil, optionally containing flavouring substances dispersed or solubilized within the oil.

In a typical process, the sheet is extended on a flat surface and a mix of oil and fat is spread on the sheet at a temperature above the melting point of the fat/oil blend. Just prior to the liquid fat/oil blend cooling below its melting temperature, a pre-mix of flavour enhancers, herbs and spice mixes is evenly applied across the surface of the sheet. The herbs and spice mixes may be coated with oil to enhance their adherence to the sheet. Gentle pressure can be applied to the sheet to achieve close contact between the sticky fat/oil mix and any dry pre-mix components. The sheet can be cut into smaller segments to fit the size of typical consumer meat portions.

The invention also relates to the use of the cooking aid for cooking food in a pan or an oven. The food is preferably meat, which may be beef, lamb, chicken, or fish, or any other meat suitable for cooking in this way. The pieces of meat are placed on the cooking aid in direct contact with the composition and are then cooked in a pan or an oven, or any other suitable cooking device. The consumer places the meat portion on the coated surface of the sheet. The sheet can be folded over to cover most or substantially all of the portion. The covered meat is placed on or in a cooking device, such as a pre-heated pan at medium heat or preheated conventional oven (between 70 and 220° C.). The cooking process is normally carried out during 5 to 7 minutes on each side, depending on the type and cut of meat. The food is ready to serve by removing the sheet.

Vegetables may also be cooked using the cooking aid of this invention. Examples include zucchinis and egg plant (aubergine). Any protein/starch food matrix having a water activity less than 0.7 may be suitable, for example, tofu and cheese.

One product possibility is a package comprising 4 units of sheet. The size of each sheet may depend on the size of the meat portions and will normally be in the range 15 to 20 cm. Each sheet will typically have 5 to 8 g total weight of fat/oil, herbs, spices and flavours.

EXAMPLES

The invention is further described with reference to the following examples. It is to be appreciated that the examples do not in any way limit the invention.

Example 1—General Method

The cook takes a portion of food and places it on the cooking aid. The food portion is covered on both sides with the sheet or loosely wrapped in the sheet. The cooking aid containing the food portion is placed on a pre-heated pan and cooked for the required time period, and on each side if appropriate, at moderate temperature. Low temperature cooking avoids fast protein degradation and improves palatability, taste perception and natural bite. The food portion is ready to serve by removing from the sheet. The ingredients of the composition give flavour to the cooked food, and the sheet protects the food from drying out ensuring natural juiciness. Flavours are better perceived due natural preserved juiciness and palatability is enhanced.

The basic method for cooking meat comprises the following steps:

1. Place a clean pan on the heating station (e.g. induction, electric or gas hob) at, for example, 50% of the maximum heating capacity. No need to add oil or fat.
2. Open the cooking aid sheet.
3. Place the meat on the open sheet and fold or wrap the sheet around the meat.
4. Place the wrapped sheet on the pre-heated pan.
5. Cook for several minutes each side.
6. Remove from the pan.
7. Discard the sheet before eating.

Example 2—Recipes

The recipes below may be used for cooking beef or chicken, or any other suitable meat or food, depending on consumer preference.

| Recipe | Component | Amount (%) |
|---|---|---|
| provencale | fractionated palm fat/sunflower oil | 25 |
| | flavours & flavour enhancers (including cultured wheat gluten, NaCl) | 68 |
| | herbs & spices (oregano, basil, tomato granules, thyme, black pepper, marjoram) | 7 |
| garlic | fractionated palm fat/sunflower oil | 25 |
| | flavours & flavour enhancers (including cultured wheat gluten, NaCl) | 60 |
| | herbs & spices (garlic powder, onion powder, dehydrated garlic pieces, parsley) | 15 |
| tomato | fractionated palm fat/sunflower oil | 25 |
| | flavours & flavour enhancers (including cultured wheat gluten, NaCl) | 57 |
| | herbs & spices (tomato pieces, marjoram, oregano, parsley) | 18 |
| paprika | fractionated palm fat/sunflower oil | 25 |
| | flavours & flavour enhancers (including cultured wheat gluten, NaCl) | 65 |
| | herbs & spices (bell pepper powder & pieces, parsley) | 10 |

It is to be appreciated that although the invention has been described with reference to specific embodiments, variations and modifications may be made without departing from the scope of the invention as defined in the claims. Furthermore, where known equivalents exist to specific features, such equivalents are incorporated as if specifically referred to in this specification.

The invention is claimed as follows:

1. A cooking aid comprising:
a) a sheet of flexible burn resistant material;
b) a first blend disposed on one face of the sheet, the first blend comprising a first oil having a melting point below 20° C. and a vegetable or animal fat having a melting point above 20° C.;
c) a second blend disposed on the first blend, the second blend comprising one or more herbs, spices or flavor enhancers; and
d) a coating disposed on the second blend, the coating comprising a coating of a second oil on the one or more herbs, spices or flavor enhancers, the second oil having a melting point below 20° C.

2. The cooking aid of claim 1, wherein the sheet is baking paper.

3. The cooking aid of claim 1, wherein at least one of the first oil or the second oil is selected from the group consisting of sunflower oil, rape seed oil, cotton seed oil, peanut oil, soya oil, olive oil, palm oil, coconut oil, palm kernel oil, and mixtures thereof.

4. The cooking aid of claim 1, wherein the vegetable or animal fat is selected from the group consisting of pork fat, tallow, lard, bone fats, butter, fractionated palm fat, any fully or partially hydrogenated or inter-esterified palm oil, cotton seed oil, peanut oil, soya oil, olive oil, sunflower oil, rape seed oil, and mixtures thereof.

5. The cooking aid of claim 1, wherein at least one of the first blend, the second blend or the coating further comprises 0.01 to 1% by weight of a monoglyceride, sterol, or lecithin relative to the total weight of the first blend, the second blend and the coating.

6. The cooking aid of claim 1, wherein the first oil, the second oil and the vegetable or animal fat together comprise 5 to 20% by weight relative to the total weight of the first blend, the second blend and the coating.

7. The cooking aid of claim 1, wherein the one or more herbs, spices and flavour enhancers comprise 0.5 to 75% by weight relative to the total weight of the first blend, the second blend and the coating.

8. The cooking aid of claim 1, wherein the one or more herbs, spices or flavour enhancers comprise at least one of parsley, rosemary, pepper or chives.

9. The cooking aid of claim 1, wherein the one or more herbs, spices or flavour enhancers comprise flavour enhancers that are 10 to 80% by weight relative to the total weight of the first blend, the second blend and the coating.

10. The cooking aid of claim 9, wherein the flavour enhancers are selected from the group consisting of inorganic salts, salts of amino acids, protein hydrolysates, flavouring preparations, yeast extracts, and mixtures thereof.

11. The cooking aid of claim 1, wherein a weight ratio of the first and second oils to the vegetable or animal fat is from 1:99 to 34:66.

12. A process for the preparation of the cooking aid of claim 1, the process comprising:

a) extending the sheet of flexible burn resistant material on a flat surface;
b) spreading the first blend comprising the vegetable or animal fat and the first oil on the sheet;
c) distributing the second blend comprising the one or more herbs, spices or flavour enhancers over the first blend; and
d) coating the second blend comprising the one or more herbs, spices or flavour enhancers with the coating comprising the second oil.

13. A method of cooking meat comprising:
placing pieces of the meat on the cooking aid of claim 1 in direct contact with at least one of the first blend, the second blend or the coating; and
then cooking the pieces of the meat on the cooking aid of claim 1.

14. A method of cooking vegetables comprising:
placing pieces of the vegetables on the cooking aid of claim 1 in direct contact with at least one of the first blend, the second blend or the coating; and
then cooking the pieces of the vegetables on the cooking aid of claim 1.

* * * * *